United States Patent Office 3,412,096
Patented Nov. 19, 1968

3,412,096
ALKYLPYRIDINE PRODUCTION
Charles R. Adams, Ippendorf, Germany, assignor to Shell Oil Company, New York, N.Y., a corporation of Delaware
No Drawing. Filed July 19, 1965, Ser. No. 473,188
11 Claims. (Cl. 260—290)

ABSTRACT OF THE DISCLOSURE

Alkylpyridines, useful as organic bases and chemical intermediates, are prepared by the vapor-phase reaction of hydrocarbon carbonyl compounds and ammonia in the presence of a calcium nickel phosphate catalyst.

This invention relates to an improved process for the production of alkylpyridines.

Methods are available in the art for the production of alkyl-substituted pyridines by reaction of carbonyl compounds, i.e., aldehydes and ketones, with ammonia in the presence of metal-containing catalysts. For example, Klingsberg, "Pyridine and Its Derivatives," Interscience, New York, 1960, pp. 460–500, reports the formation of 2-ethyl-3,5-dimethylpyridine by reaction of propionaldehyde and ammonia over metal phosphate catalysts such as boron phosphate, aluminum phosphate and cadmium phosphate. German Patent No. 1,058,058 issued Apr. 27, 1959, to Badische discloses reaction of acetaldehyde with ammonia over acid phosphates of metals of Groups I and II of the Periodic Table to produce alkylpyridine product. However, such acid phosphate catalysts are not suitably employed when aldehydes of higher molecular weight are employed as reactants. It would be of advantage to provide an improved process for the production of alkylpyridines from reaction of carbonylic compounds and ammonia.

It is an object of the present invention to provide an improved process for the production of alkyl-substituted pyridines by reaction of certain carbonyl compounds with ammonia. More particularly, it is an object to provide an improved process for the production of alkylpyridines by reaction of carbonyl compounds with ammonia in the presence of certain oxide catalysts comprising calcium, nickel, phosphorus and oxygen.

It has now been found that these objects are accomplished by the process of contacting acyclic, saturated, hydrocarbon aldehydes or ketones having at least three carbon atoms and at least two hydrogen substituents on a carbon atom alpha to the carbonyl group, with ammonia, in the vapor phase, in the presence of certain three-component oxide catalysts comprising calcium, nickel and phosphorus in chemical combination with oxygen. The process of the invention typically affords comparatively higher yields of alkyl-substituted pyridine product than do processes employing known two-component oxide or acidic oxide catalysts.

The carbonyl compounds employed in the process of the invention are acyclic, saturated hydrocarbon carbonyl compounds, i.e., aldehydes and ketones, of only atoms of carbon, hydrogen and the carbonyl oxygen, and from 3 to 12 carbon atoms wherein at least one carbon atom alpha to the single carbonyl moiety, i.e., adjacent to the >C=O moiety, has at least two hydrogen substituents.

The carbonyl reactant is represented by the empirical formula $$C_nH_{2n}O$$

wherein $n$ is a whole number from 3 to 12 inclusive and the carbonyl reactant molecule as a whole contains only carbon-carbon single bonds with at least two of the indicated hydrogens located as substituents on a carbon atom alpha to the carbonyl group.

Illustrative carbonyl reactants include aldehydes such as propionaldehyde, butyraldehyde, n-hexanal, 4-methylpentanal, 3-ethylhexanal, n-dodecanal, n-nonanal, 4,6-dimethyloctanal and 4-propyloctanal, as well as ketones such as acetone, methyl ethyl ketone, ethyl nonyl ketone, dibutyl ketone, diethylketone, bis(4-methylpentyl) ketone and propyl octyl ketone. The preferred carbonyl reactants are straight-chain carbonyl compounds, that is, all carbon atoms present form a continuous unbranched carbon-atom chain, and best results are obtained when the carbonyl reactant is an acyclic, saturated, straight-chain hydrocarbon carbonyl compound of from 3 to 5 carbon atoms. In general, aldehyde carbonyl reactants are preferred over analogous ketone reactants, and the utilization of propionaldehyde is particularly preferred.

The process of the invention comprises contacting the carbonyl reactant with ammonia in the vapor phase at elevated temperatures over a metal oxide catalyst, which catalyst comprises essentially oxygen chemically combined with calcium, nickel and phosphorus catalyst components. The chemical nature of suitable catalysts is variable, that is, components are present at least partially as a mixture of oxides per se, or the components are present in chemically combined form such as calcium nickel phosphate. The preferred catalyst, however, consists essentially of a normal metal phosphate material composed of calcium and nickel chemically combined with orthophosphate radicals. Although no specific gram-atomic ratio of calcium to nickel in the catalyst is required, in the preferred modification the catalyst contains on an average from about 6 to about 12 atoms of calcium per atom of nickel, with best results being obtained when the ratio of calcium atoms to nickel atoms is from about 6.5 to about 8.5. These calcium nickel phosphate catalysts are prepared by conventional methods, as by the methods described in U.S. Patent No. 2,456,367 issued Dec. 14, 1948, to Britton et al., in U.S. Patent No. 2,542,813 issued Feb. 20, 1951, to Heath, or in U.S. Patent No. 2,816,081 issued Dec. 10, 1957, to Heath et al.

The process of the invention comprises contacting the catalyst with a gaseous mixture of carbonyl reactant and ammonia in a suitable reactor, which is customarily tubular in form. The catalyst is maintained in the reactor in the form of a stationary bed, as a dense suspended system or as a fluidized system, and the process is conducted as a batch, semi-continuous or a continuous operation.

The method of mixing the reactants is not critical. The reactants may be mixed prior to or simultaneously with introduction into the reactor, although best results are obtained when the carbonyl reactant and ammonia are maintained separately until the time of catalyst contacting. It is also desirable, on occasion, to employ preheating means to promote more extensive vaporization of the carbonyl compound prior to introduction into the reactor. The molar ratio of carbonyl compound to ammonia suitably employed is variable, with molar ratios of carbonyl compound to ammonia from about 1:10 to about 10:1 being satisfactory. From stoichiometric considerations of the reaction, the desirability of a molar amount of carbonyl compound at least equal to the molar amount of ammonia is indicated, and molar ratios of carbonyl compound to ammonia from about 1:1 to about 4:1 are preferred. The carbonyl compound and ammonia are suitably mixed and introduced to the reactor in the substantial absence of diluent materials; however, it is also on occasion useful to employ inert gaseous diluents as carrier gases, particularly when the carbonyl compound is high-boiling. Exemplary diluent gases to be employed in the latter modification include nitrogen, argon, helium, steam and the like.

The reaction is conducted at any convenient pressure. Although the process is operable at atmospheric, subatmospheric or superatmospheric pressure so long as the reactants are maintained in the vapor phase, little advantage is realized by employing pressures substantially different from atmospheric pressure, and the use of a reaction pressure that is substantially atmospheric, e.g., from about 0.5 atmosphere to about 2 atmospheres is preferred. The use of elevated temperature has been found to be essential, and in obtaining optimum yields of alkyl pyridine product the reaction temperature is a somewhat critical factor. Reaction temperatures of at least about 350° C. are satisfactory, although temperatures of at least about 400° C. are preferred and when the carbonyl reactant is a ketone, best results are obtained when a reaction temperature of at least about 450° C. is utilized. The maximum reaction temperature is not so critical, and although higher temperatures are occasionally useful, reaction temperatures below about 600° C. are generally satisfactory and temperatures below about 575° C. are preferred.

In the process of the invention, as in the case of most high-temperature reactions of organic compounds, it is desirable to control the reaction time, i.e., the average time during which the reactants are in contact with the catalyst to prevent undesirable further reaction. The reaction time is typically controlled by varying the rate of reactant introduction into the reactor, and reaction times of from about 0.1 second to about 20 seconds are satisfactory. An alternative method of measuring reactant-catalyst contact time is in terms of the gaseous hourly space velocity, commonly termed GHSV, which term measures the volume of gaseous reactants contacting each volume of catalyst per hour and is customarily expressed in units of reciprocal time. In the process of the invention, GHSV values from about 50 hr.$^{-1}$ to about 2500 hr.$^{-1}$ are satisfactory, with the optimum value depending primarily upon the reactivity of the carbonyl reactant. When a ketone is employed as the carbonyl reactant, a comparatively low GHSV value is preferred, e.g., a GHSV value of from about 75 hr.$^{-1}$ to about 1000 hr.$^{-1}$. Alternatively, when an aldehyde is utilized, GHSV values from about 500 hr.$^{-1}$ to about 2000 hr.$^{-1}$ are more satisfactory.

Subsequent to reaction, the effluent from the reactor is condensed and the desired pyridine product is separated and recovered by convenitonal means as by fractional distillation, selective extraction, crystallization or the like. Unreacted carbonyl compound and ammonia are suitably recovered and recycled.

The products of the invention are pyridines possessing one or more alkyl substituents on the ring carbon atoms thereof, and most frequently pyridine products having three alkyl substituents are encountered. When aldehydes are employed as the carbonyl reactant, a 2,3,5-trialkyl-pyridine is the predominant product, apparently being formed by condensation of three molecules of the aldehyde and one molecule of ammonia. For example, propionaldehyde reacts with ammonia in the process of the invention to produce 2-ethyl-3,5-dimethylpyridine. Alternatively, ultilization of a straight-chain ketone as the carbonyl reactant customarily results in the formation of a 2,3,6-trialkylpyridine, in this case apparently through condensation of the ketone with ammonia in a 2:1 molar ratio. An illustrative example of the latter case is the reaction of methyl ethyl ketone with ammonia to produce 2,3,6-trimethylpyridine. It will be apparent that by varying the type of carbonyl reactant and the number of carbon atoms present therein, a variety of alkyl-substituted pyridine products are produced.

The pyridine products are useful in many applications, e.g., as extracting agents, organic bases and the like, and are also useful as chemical intermediates in the production of pyridine carboxylic acids, piperidine derivatives and other derivatives prepared from the pyridine product by conventional methods.

To further illustrate the improved process of the invention, the following examples are provided. It should be understood that the details thereof are not to be regarded as limitations, as they may be varied as will be understood by one skilled in this art.

Example I

In this and subsequent examples, the reaction was conducted in a glass reactor over a fixed bed of a calcium-nickel phosphate catalyst having a ratio of atoms of calcium per atom of nickel of approximately 7. Ammonia was mixed with the other components of the feed gas just prior to contacting the catalyst, and the normally liquid feeds were introduced by saturating a helium carrier gas stream which was bubbled through the liquid. The gaseous mixture was passed over the catalyst at atmospheric pressure and the effluent from the reactor was analyzed by the comparison of mass spectra and the gas-liquid chromatographic emergence times of the products with authentic samples, or by infrared and nuclear magnetic resonance spectra. The reported GHSV values are based on total volume of gaseous feed corrected to standard conditions. As employed in the examples, conversion indicates the percentage of feed going to all products, and selectively indicates the percent of feed converted to the indicated product.

Diethyl ketone and ammonia were contacted by this procedure in the present of the metal oxide catalyst under conditions where the partial pressure of each reactant was 0.3 atmosphere and the GHSV value was 90 hr.$^{-1}$. The results of a series of experiments are shown in Table I.

TABLE I

| Temp., °C. | Ketone Conversion, percent | Selectivity to 2,6-diethyl-3-methyl-pyridine, percent |
| --- | --- | --- |
| 450 | 66 | 63 |
| 450 | 49 | 69 |
| 450 | 44 | 67 |

Example II

By a procedure similar to that of Example I, methyl ethyl ketone and ammonia were mixed in a ratio of 0.7 and passed over the catalyst at 500° C. The results of several experiments are shown in Table II.

TABLE II

| GHSV, hr.$^{-1}$ | Ketone Conversion, percent | Selectivity to 2,3,6-trimethyl-pyridine, percent |
| --- | --- | --- |
| 150 | 70 | 38 |
| 225 | 38 | 42 |

Example III

By a procedure similar to that of Example I, various mixtures of propionaldehyde and ammonia were passed over the calcium-nickel-phosphorus oxide catalyst of the invention as well as other catalyst materials. The results are shown in Table III wherein selectively refers to the formation of 2-ethyl-3,5-dimethylpyridine.

TABLE III

| Press., atm. | | GHSV, hr.$^{-1}$ | Temp., °C. | Conversion, percent | Selectivity, percent |
|---|---|---|---|---|---|
| Propionaldehyde | NH$^3$ | | | | |
| Calcium Phosphate: | | | | | |
| 0.17 | 0.28 | 1,100 | 450 | 100 | 42 |
| 0.19 | 0.16 | 900 | 450 | 100 | 34 |
| Quartz Chips: | | | | | |
| 0.28 | 0.14 | 1,100 | 450 | 29 | 50 |
| 0.28 | 0.14 | 1,100 | 450 | 28 | 55 |
| Calcium Nickel Phosphate: | | | | | |
| 0.28 | 0.14 | 1,100 | 350 | 94 | 61 |
| 0.25 | 0.25 | 1,200 | 400 | 97 | 72 |
| 0.25 | 0.25 | 1,200 | 450 | 99 | 84 |
| 0.28 | 0.14 | 1,100 | 500 | 99 | 48 |

The mixed feed was also maintained at an elevated temperature in the absence of any added catalytic material. In each case, the conversion and/or selectivity obtained was lower than obtained in experiments conducted in the presence of catalyst.

Example IV

When n-butyraldehyde and ammonia are reacted by a procedure similar to that of Example I, a good yield of 2-propyl-3,5-diethylpyridine is obtained. When isobutyraldehyde is employed as the aldehyde reactant, no pyridine product is observed. Substitution of isovaleraldehyde in the above procedure results in the formation of a good yield of 2-isobutyl-3,5-diisopropylpyridine.

I claim as my invention:

1. The process of producing alkyl-substituted pyridines by contacting acyclic, saturated, hydrocarbon monocarbonyl compound having from 3 to 12 carbon atoms and at least two hydrogen substituents on at least one carbon atom alpha to the carbonyl group, with ammonia, in the vapor phase at a temperature from about 350° C. to about 600° C., in the presence of a calcium nickel phosphate catalyst.

2. The process of producing alkyl-substituted pyridines by contacting acyclic, saturated, hydrocarbon monocarbonyl compound of from 3 to 12 carbon atoms and at least two hydrogen substituents on at least one carbon atom alpha to the carbonyl group, with ammonia, in the presence of a calcium nickel phosphate catalyst of from about 6 atoms to about 12 atoms of calcium per atom of nickel, in the vapor phase at a temperature from about 350° C. to about 600° C. and at a gaseous hourly space velocity from about 50 hr.$^{-1}$ to about 2500 hr.$^{-1}$.

3. The process of claim 2 wherein the carbonyl compound is carbonyl compound of 3 to 5 carbon atoms.

4. The process of producing alkyl-substituted pyridines by contacting acyclic, saturated hydrocarbon mono-aldehyde of from 3 to 12 carbon atoms having at least two hydrogen substituents on the carbon atom alpha to the carbonyl group, with from about 0.1 mole to about 10 moles of ammonia per mole of aldehyde, in the presence of calcium nickel orthophosphate catalyst of from about 6 atoms to about 12 atoms of calcium per atom of nickel, in the vapor phase at a temperature of from about 350° C. to about 600° C. and at a gaseous hourly space velocity of from about 500 hr.$^{-1}$ to about 2000 hr.$^{-1}$.

5. The process of claim 4 wherein the molar ratio of aldehyde to ammonia is from about 1:1 to about 4:1.

6. The process of claim 4 wherein the aldehyde is propionaldehyde.

7. The process of claim 4 wherein the aldehyde is butyraldehyde.

8. The process of producing alkyl-substituted pyridines by contacting acyclic, saturated hydrocarbon mono-ketone of from 3 to 12 carbon atoms having at least two hydrogen substituents on at least one carbon atom alpha to the carbonyl group, with from about 0.1 mole to about 10 moles per mole of ketone of ammonia, in the presence of calcium nickel ortho-phosphate catalyst of from about 6 atoms to about 12 atoms of calcium per atom of nickel, in the vapor phase at a temperature of from about 350° C. to about 600° C. and a gaseous hourly space velocity of from about 75 hr.$^{-1}$ to about 1000 hr.$^{-1}$.

9. The process of claim 8 wherein the molar ratio of ketone to ammonia is from about 1:1 to about 4:1.

10. The process of claim 8 wherein the ketone is diethyl ketone.

11. The process of claim 8 wherein the ketone is methyl ethyl ketone.

References Cited

UNITED STATES PATENTS 2,775,596  12/1956  Mahan _____ 260—290
2,816,081  12/1957  Heath et al. _____ 252—437

FOREIGN PATENTS 816,973  7/1959  Great Britain.
964,993  7/1964  Great Britain.

OTHER REFERENCES

Brody et al.: Ch. II of Pyridine & Its Derivatives (Interscience, N.Y., 1960), pp. 477–8.

HENRY R. JILES, *Primary Examiner.*

C. M. SHURKO, *Assistant Examiner.*